(12) United States Patent
Tooker et al.

(10) Patent No.: US 10,434,844 B2
(45) Date of Patent: Oct. 8, 2019

(54) VEHICLE WINDOW ASSEMBLY WITH LOUVERED WINDOW

(71) Applicant: MAGNA MIRRORS OF AMERICA, INC., Holland, MI (US)

(72) Inventors: Troy F. Tooker, Allegan, MI (US); David K. Johnson, Holland, MI (US); Julie L. Quinones, Dearborn, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 501 days.

(21) Appl. No.: 14/107,623

(22) Filed: Dec. 16, 2013

(65) Prior Publication Data

US 2014/0170357 A1    Jun. 19, 2014

Related U.S. Application Data

(60) Provisional application No. 61/839,583, filed on Jun. 26, 2013, provisional application No. 61/738,095, filed on Dec. 17, 2012.

(51) Int. Cl.
*B60J 1/10*    (2006.01)
*B60J 10/70*   (2016.01)
*B32B 17/10*   (2006.01)

(52) U.S. Cl.
CPC ............... *B60J 1/10* (2013.01); *B60J 10/70* (2016.02); *B32B 17/10018* (2013.01); *B32B 17/10779* (2013.01)

(58) Field of Classification Search
CPC ...... Y10T 428/16; Y10T 428/161; B60J 1/10; B60J 1/085

(Continued)

(56) References Cited

U.S. PATENT DOCUMENTS 2,061,760 A * 11/1936 Fisher ..................... B60J 10/02
                                                              296/93
3,843,982 A * 10/1974 Lane ......................... B60J 1/06
                                                              114/361

(Continued)

FOREIGN PATENT DOCUMENTS

JP       2001071752 A  *  3/2001

OTHER PUBLICATIONS

Oxford English Dictionary online, entry for "film", retrevied Jul. 10, 2015.*

(Continued)

*Primary Examiner* — Frank J Vineis
*Assistant Examiner* — Laura B Figg
(74) *Attorney, Agent, or Firm* — Honigman LLP (57) ABSTRACT

A window assembly for a vehicle includes a plurality of window panels arranged with at least one pair of adjacent window panels, with adjacent edge portions of adjacent ones of the window panels joined by a respective molded joining element. The adjacent edge portions joined by a respective molded joining element are offset or non-coplanar. The molded joining element may comprise an encapsulation that at least partially receives a perimeter edge portion of at least one of the adjacent window panels. The molded joining element may at least partially receive a rear perimeter edge portion of a forward window panel and may not overlap an outer surface of the forward window panel, with the molded joining element at least partially receiving a front perimeter edge portion of a rearward window panel.

20 Claims, 9 Drawing Sheets

(58) Field of Classification Search
USPC .............. 296/146.15, 201; 52/204.6, 204.53, 52/204.62; 49/501
See application file for complete search history.

(56) References Cited

U.S. PATENT DOCUMENTS

| | | | | |
|---|---|---|---|---|
| 5,154,028 | A * | 10/1992 | Hill et al. ..................... | 52/208 |
| 5,514,028 | A * | 5/1996 | Ali ..................... | B24D 11/008 |
| | | | | 451/526 |
| 5,542,214 | A * | 8/1996 | Buening ................... | B60J 1/16 |
| | | | | 49/127 |
| 5,551,197 | A | 9/1996 | Repp et al. | |
| 5,799,444 | A * | 9/1998 | Freimark ............... | B60J 1/1853 |
| | | | | 49/209 |
| 5,853,895 | A | 12/1998 | Lewno | |
| 6,691,464 | B2 | 2/2004 | Nestell et al. | |
| 7,003,916 | B2 * | 2/2006 | Nestell .................. | B60J 1/1853 |
| | | | | 49/125 |
| 7,073,293 | B2 | 7/2006 | Galer | |
| 8,276,409 | B2 | 10/2012 | Tooker et al. | |
| 8,402,695 | B2 | 3/2013 | Smith et al. | |
| 8,881,458 | B2 | 11/2014 | Snider et al. | |
| 2003/0075947 | A1 * | 4/2003 | Fujiwara ................... | B60J 1/18 |
| | | | | 296/93 |
| 2003/0213179 | A1 | 11/2003 | Galer | |
| 2004/0020131 | A1 | 2/2004 | Galer | |
| 2004/0035066 | A1 * | 2/2004 | Leconte ................... | B60J 10/70 |
| | | | | 52/204.591 |
| 2006/0107600 | A1 | 5/2006 | Nestell et al. | |
| 2008/0127563 | A1 | 6/2008 | Tooker et al. | |
| 2010/0107497 | A1 | 5/2010 | Hulst et al. | |
| 2014/0141194 | A1 | 5/2014 | Lynam | |
| 2015/0101254 | A1 | 4/2015 | Tooker et al. | |

OTHER PUBLICATIONS

Oxford English Dictionary, entry "Join", retreived Jan. 15, 2016, entry from the 1901 edition.*
Oxford English Dictionary, entry "Film", retreived Jul. 11, 2015, entry from the 1896 edition.*
Oxford English Dictionary, entry for "Fixedly" retreived Jun. 21, 2016.*
Oxford English Dictonary, entry for "Attach" retreived Jun. 21, 2016.*
Oxford Engish Dictonary, entry for "Join" retreived Jun. 21, 2016.*
Oxford English Dictonary, entry for "Reveive" retreived Jun. 21, 2016.*
JP2001071752 A English translation. Translation previously provided Feb. 1, 2016.*
Oxford English Dictonary entry for "Film" retreived Jul. 11, 2015.*

* cited by examiner

VEHICLE WINDOW ASSEMBLY WITH LOUVERED WINDOW

CROSS REFERENCE TO RELATED APPLICATIONS

The present application is related to U.S. provisional applications Ser. No. 61/839,583, filed Jun. 26, 2013, and Ser. No. 61/738,095, filed Dec. 17, 2012, which are hereby incorporated herein by reference in their entireties.

FIELD OF THE INVENTION

The present invention relates to window assemblies for vehicles and, more particularly to a side or rear fixed window assembly for a vehicle.

BACKGROUND OF THE INVENTION

It is known to provide a window assembly for an opening of a vehicle, such as a side window assembly for a side opening of a vehicle. Conventional side openings of sports cars or the like may have a louvers or spaced apart body panels established at the vehicle body and outside of a fixed window panel, with the louvered panels comprising an opaque metal or plastic.

SUMMARY OF THE INVENTION

The present invention provides a vehicle louvered window assembly that comprises a plurality of glass panels that encapsulated or partially encapsulated along their peripheries with adjacent perimeter edge regions joined together by respective encapsulation portions or ribs. The glass panels are preferably louvered or offset or non-coplanar at their adjacent perimeter edges and held in such a configuration via the partial encapsulation of the perimeter edge portions or regions of adjacent panels.

According to an aspect of the present invention, a window assembly for a vehicle comprises a plurality of window panels arranged with at least one pair of adjacent window panels, with adjacent edge portions of adjacent ones of the window panels being joined by a respective molded joining element. The adjacent edge portions joined by a respective molded joining element are offset or non-coplanar.

The window panels may comprise glass window panels, and the window assembly may comprise a side or rear or top window of a vehicle. The molded joining element may comprise an encapsulation that at least partially receives a perimeter edge portion of at least one of the adjacent window panels.

For example, the adjacent window panels may comprise first and second window panels for a side window assembly of a vehicle, with the second window panel disposed rearward of the first window panel. The molded joining element partially receives a rear perimeter edge portion of the first window panel and does not overlap an outer surface of the first window panel, and the molded joining element at least partially receives a front perimeter edge portion of the second window panel. An outer surface of the first window panel at or near the rear perimeter edge portion is non-coplanar with an outer surface of the second window panel at or near the front perimeter edge portion.

Optionally, the window assembly may include a third window panel adjacent and rearward of the second window panel, with a second molded joining element partially receiving a rear perimeter edge portion of the second window panel and not overlapping an outer surface of the second window panel. Optionally, the window assembly may include a perimeter encapsulation that is established about a periphery of the window panels. The perimeter encapsulation may partially receive a perimeter edge portion of the window panels and does not overlap an outer surface of the window panels.

These and other objects, advantages, purposes and features of the present invention will become apparent upon review of the following specification in conjunction with the drawings.

DESCRIPTION OF THE PREFERRED EMBODIMENTS

Figure 1:
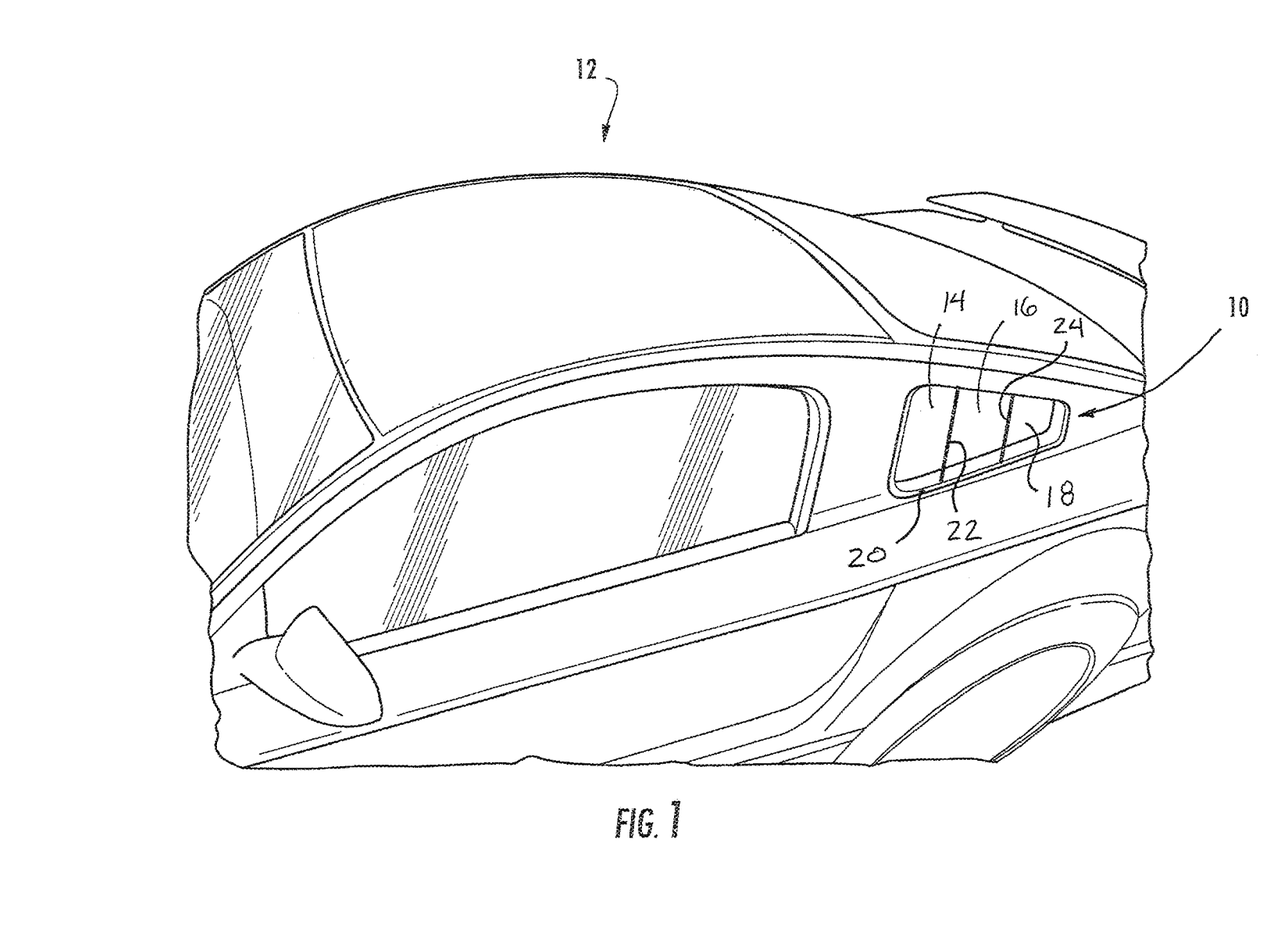
FIG. 1 is a perspective view of a vehicle having a window assembly in accordance with the present invention.
Figure 2:
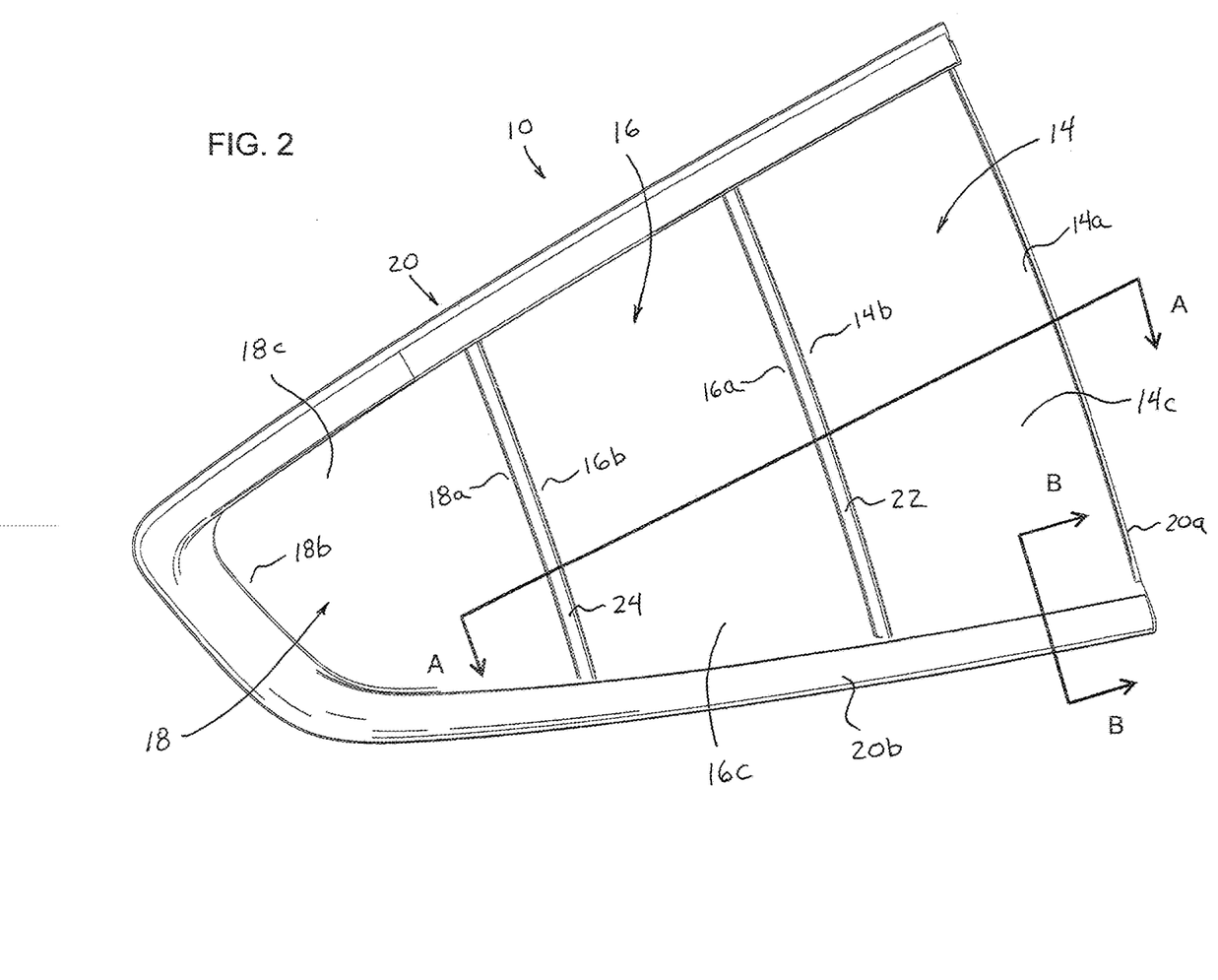
FIG. 2 is a side elevation of a vehicular window assembly of the present invention.
Figure 3:
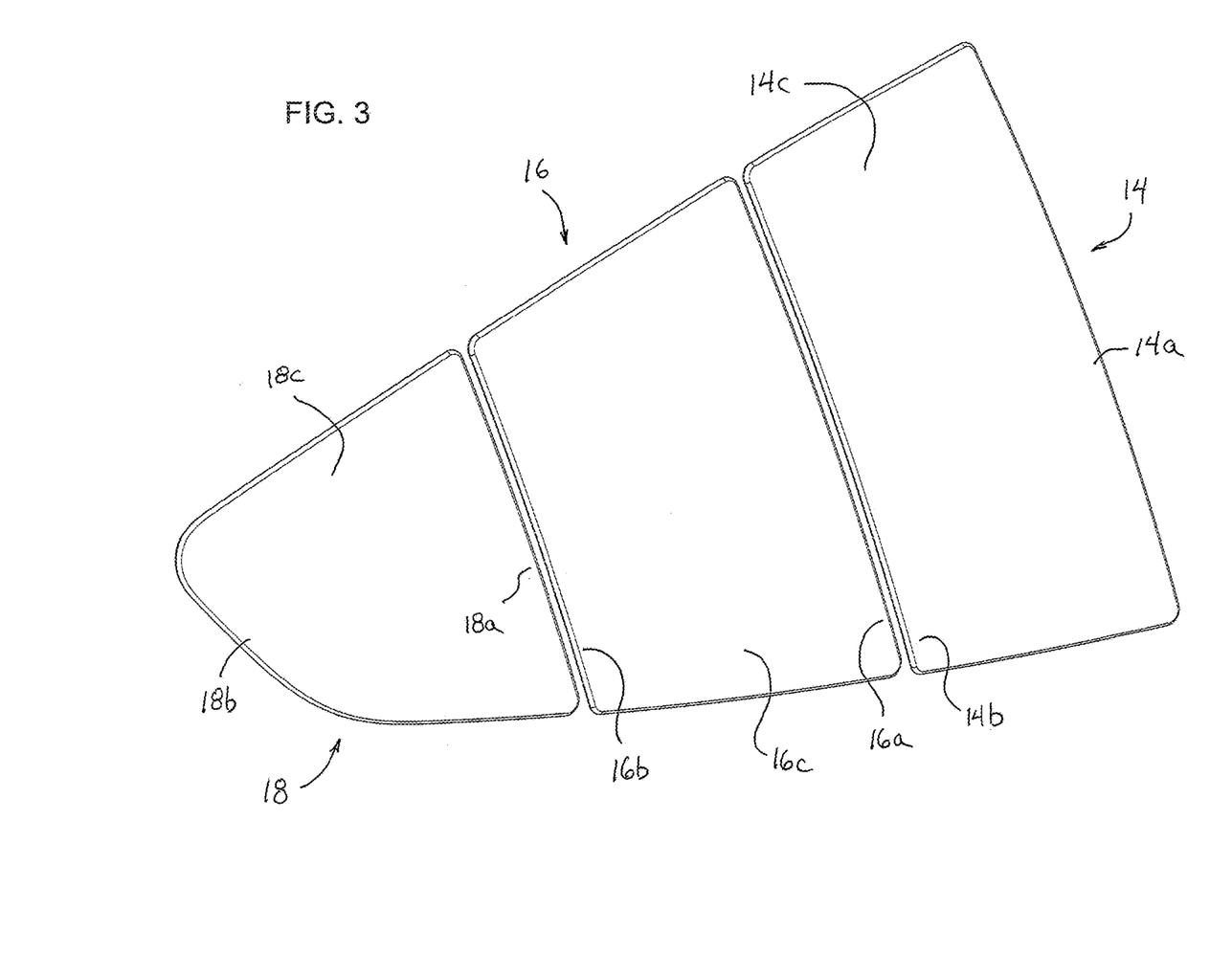
FIG. 3 is a side elevation of the glass panels of the vehicular window assembly of FIG. 2.

Referring now to the drawings and the illustrative embodiments depicted therein, a window assembly 10 of a vehicle 12 comprises a plurality of glass window panels 14, 16, 18 that are louvered or non-coplanar. The glass window panels 14, 16, 18 are disposed at a perimeter frame or encapsulation 20 and have an encapsulation portion or rib 22 at and between and adjoining panels 14 and 16 and an encapsulation portion or rib 24 at and between and adjoining panels 16 and 18. The window assembly 10 provides a louvered window assembly that is suitable for use as a side window or rear window of a sports car or the like (such as a small fixed side rear window of a vehicle or a rear window of a hatchback vehicle or the like). The louvered window assembly provides a plurality of separated and louvered transparent window panels (and optionally the window panels may be tinted or darkened or otherwise made less light transmitting or even substantially non-light transmitting, depending on the particular application of the window assembly.

Figure 4:
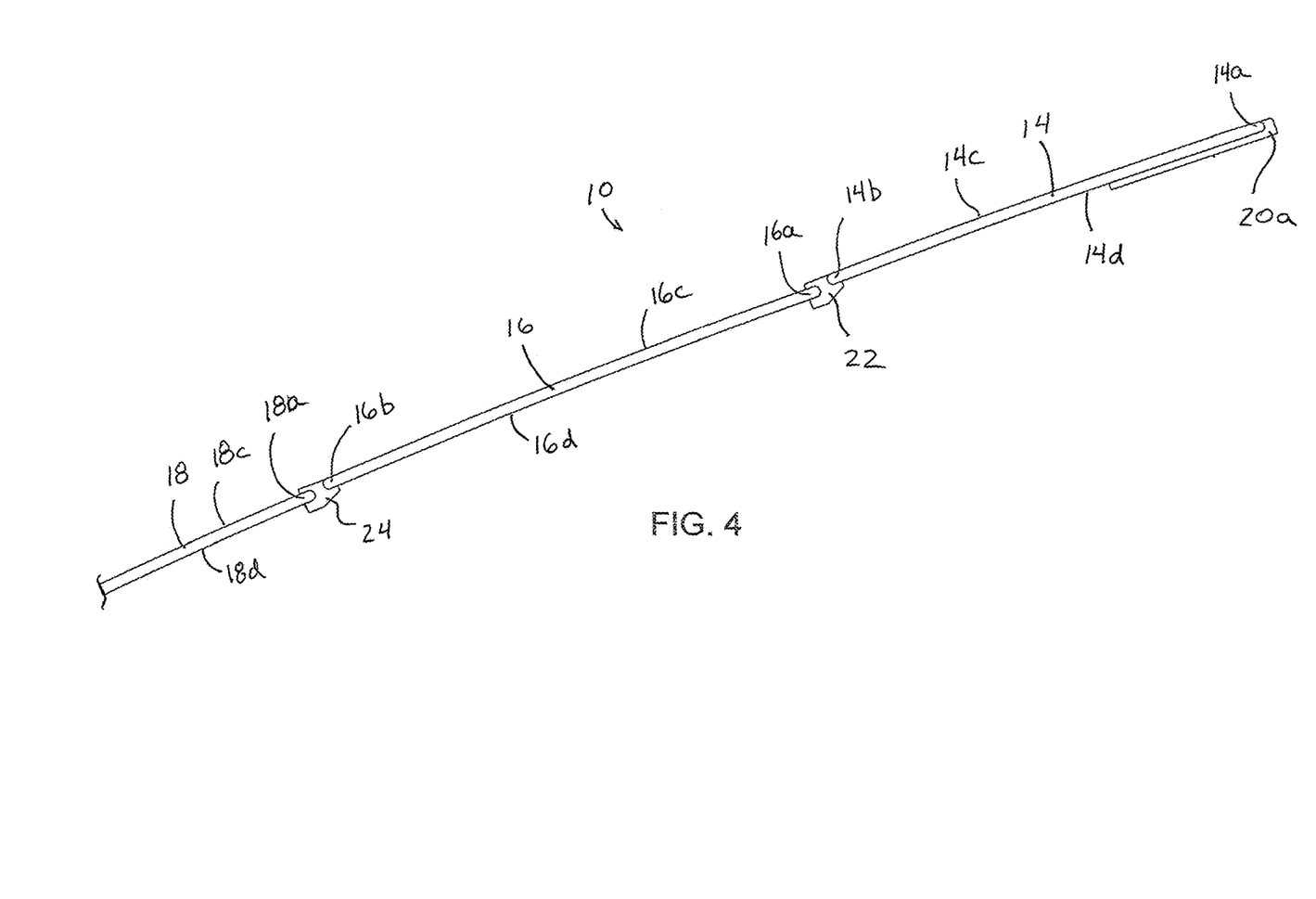
FIG. 4 is a sectional view of the vehicular window assembly taken along the line A-A in FIG. 2.
Figure 5:
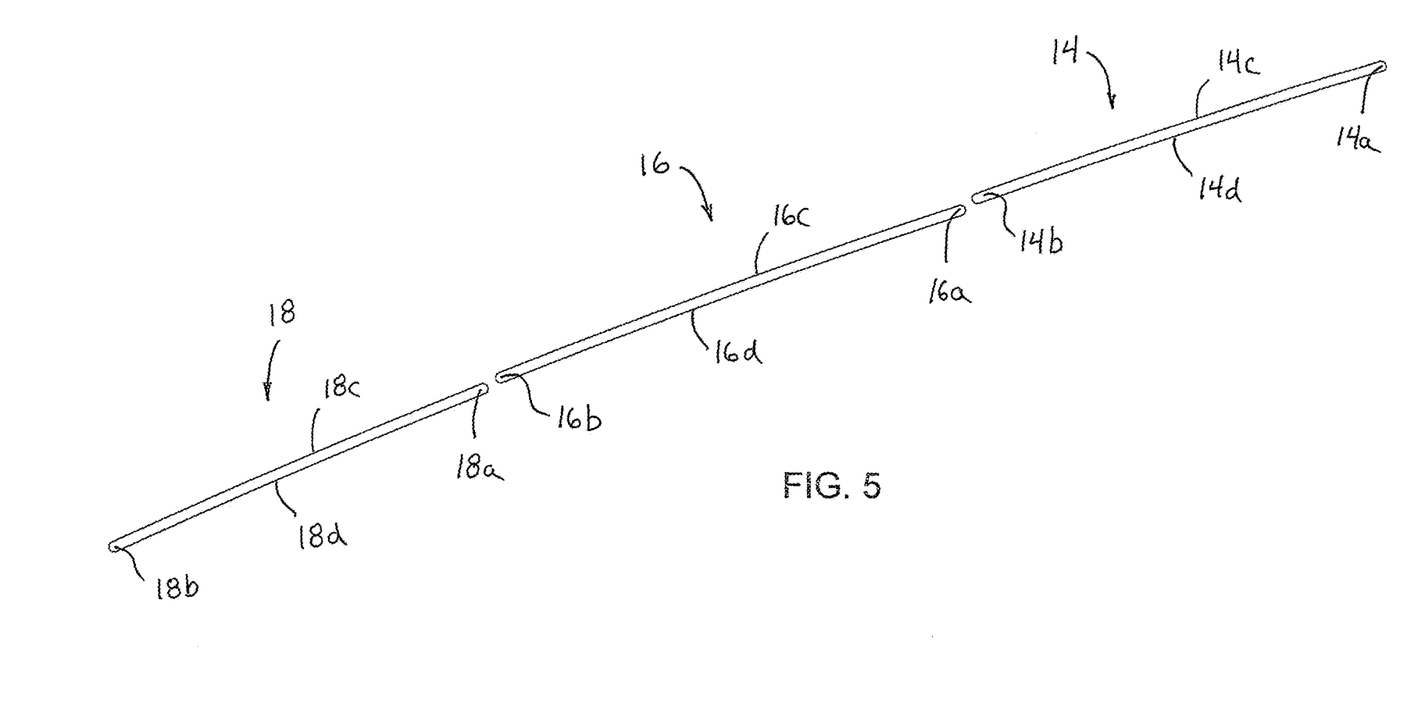
FIG. 5 is a sectional view of the glass panels of FIG. 3, shown without the encapsulations or ribs.

As best seen with reference to FIGS. 2-5, the window panels 14, 16, 18 are louvered or non-coplanar. For example, and as shown in FIGS. 4 and 5, a rearward perimeter portion 14b of forwardmost window panel 14 is outboard of a forward perimeter portion 16a of middle window panel 16, while a rearward perimeter portion 16b of middle window panel 16 is outboard of a forward perimeter portion 18a of rearwardmost window panel 18. The adjoining or adjacent perimeter edges 14b, 16a and 16b, 18a are joined via the respective encapsulation portion or rib 22, 24. In the illustrated embodiment, and as best shown in FIG. 4, encapsulation 22 at least partially receives rear perimeter edge 14b therein and at least partially receives front perimeter edge 16a, while encapsulation 24 at least partially receives rear perimeter edge 16b therein and at least partially receives front perimeter edge 18a. The encapsulations 22, 24 are disposed at the rearward perimeter edges 14b, 16b, respectively, so that the encapsulation does not encompass the outer surface 14c, 16c of the window panel, such that the encapsulation 22, 24 may provide a generally flush configuration at the outer surface 14c, 16c of the respective window panel 14, 16 (with an outer surface of the encapsulation 22 being generally coplanar with the outer surface of the window panel 14 and an outer surface 14c of the encapsulation 24 being generally coplanar with the outer surface 16c of the window panel 16). The encapsulation may be overmolded onto the perimeter edge portions of the glass panels or otherwise bonded at the perimeter edge portions of the glass panels.

Optionally, an outer frame or encapsulation 20 may be provided about and along the outer perimeters of the glass panels. As shown in FIG. 2, the frame 20 may include a forward frame portion 20a that is disposed at the forward perimeter edge region 14a of forward window panel 14 and a perimeter molding or frame portion 20b that is disposed at the upper and lower perimeter edge regions or portions of the window panels and at the rear perimeter edge region or portion 18b of rear window panel 18, whereby the forward frame portion 20a and the perimeter frame portion 20b substantially circumscribe the window panels. As shown in FIG. 4, the forward frame portion 20a may be molded or established at the inner surface 14d of the forward window panel 14 and may at least partially receive the forward perimeter edge 14a therein (and may not overlap the outer surface 14c of the window panel 14 so as to provide a generally flush configuration of the frame portion at the outer surface of the window panel).

Figure 6:
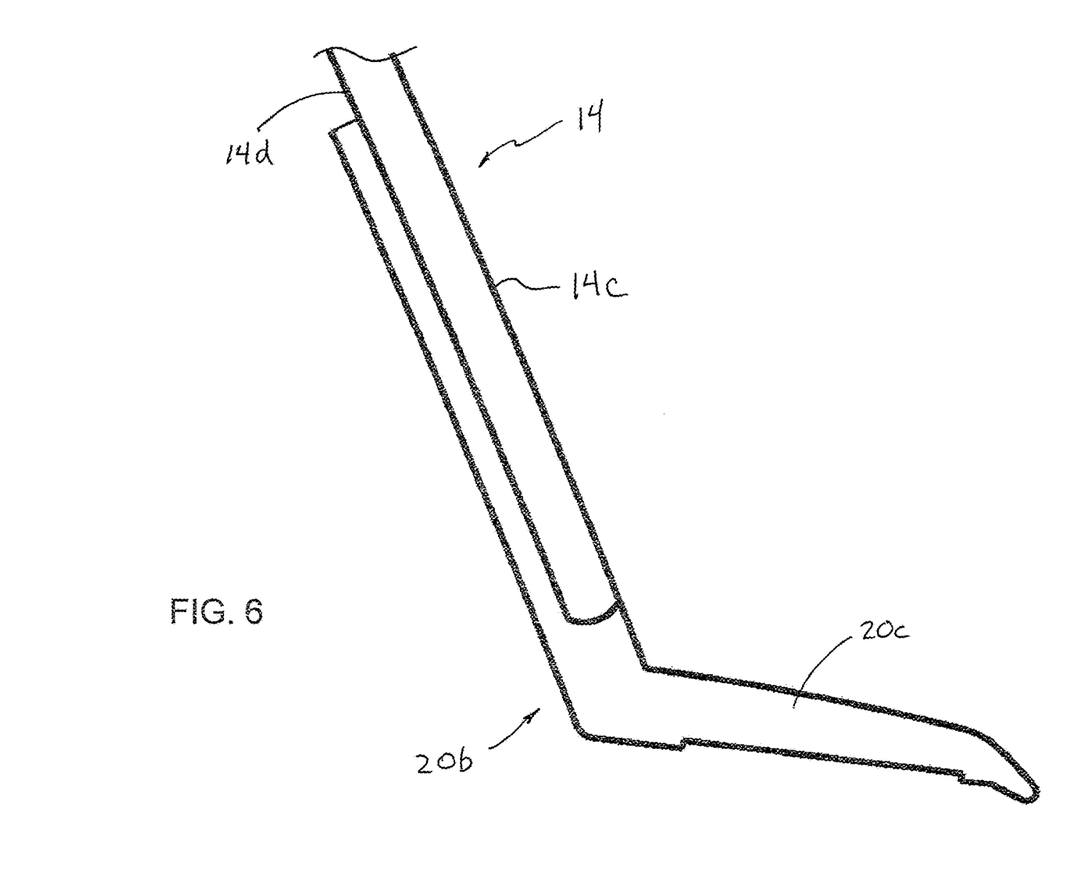
FIG. 6 is a sectional view of the vehicular window assembly taken along the line B-B in FIG. 2.

The perimeter frame portion 20b, and such as shown in FIG. 6, may also be molded or established at the inner surfaces (inner surface 14d of forward window panel 14 is shown in FIG. 6, but the frame would be established at the inner surfaces 16d, 18d of the other window panels 16, 18 in a similar manner) and may at least partially receive the perimeter edges therein (and may not overlap the outer surfaces of the window panels so as to provide a generally flush configuration of the frame portion at the outer surfaces of the window panels). The perimeter frame portion 20b may include a flange or seal 20c that extends or protrudes outwardly around the window panel, such as for mounting and/or sealing the window assembly 10 at the body of the vehicle.

The encapsulations or frame portions may comprise any suitable materials, and may be formed or molded out of a plastic or polymeric material (such as a polycarbonate or an ABS or PET material) or the like. The frame portions may be molded over and around the perimeter edges and perimeter regions of the inner surfaces of the glass panels so as to receive or encompass the perimeter edges and to secure the frame portion at the perimeter edges of the glass panels. For example, the glass panels may be placed in a mold cavity, where the perimeter frame and/or encapsulations are molded over (such as via injection molding or the like) and around and along the perimeter edge regions of the glass panels and between the adjacent edge regions of the glass panels to encapsulate the perimeter edges of the glass panels and the periphery of the joined glass panels. Optionally, the frame portion may be adhesively bonded to the perimeter edges of the glass panel and may be bonded at the inner surface of the glass panel (and optionally may overlap or encompass the outer surface of the glass panel and may be bonded at the inner surface of the glass panel), such as by utilizing aspects of the window assemblies described in U.S. Pat. Nos. 7,838,115; 7,332,225; 6,846,039; 6,319,344; 6,068,719; 5,853,895; 7,588,652; 7,360,338; 6,871,450; 6,298,606; 6,128,860; 5,966,874; 5,704,173; 5,551,197, which are hereby incorporated herein by reference in their entireties.

The window panels may comprise glass window panels, such as transparent tempered glass window panels or the like. Optionally, the window panels may comprise a non-glass material, such as a transparent or substantially transparent plastic or polymeric or acrylic material or the like. Optionally, the window panels may be molded and the molding may include the ribs and/or frame portions to provide a unitary construction of the window assembly. Although shown and described as a small fixed side window (having three window panels) for a vehicle, clearly, the window assembly of the present invention may have two or three or four or more louvered window panels such as described above and may be suitable for a larger fixed side window and/or a rear window (such as a liftgate window such as for a hatchback vehicle or the like) or a top window, such as a sunroof or moonroof or the like.

Optionally, an opaque coating or frit layer may be established at the perimeter regions of the glass panels to substantially conceal or hide the portions of the frame and encapsulations or ribs that are disposed at the rear surface of the window panels. Optionally, the frit or paint or ink layer or coating may be disposed or screened onto a surfaces of the glass panels after forming the glass panels. In applications where an opaque or non-transparent frit layer or other pattern or the like may be disposed at the surface of the glass panels, the adhesive may comprise a substantially non-transparent adhesive. The opaque layer or frit layer may comprise a ceramic frit layer and may function to facilitate adhering or bonding of the perimeter frame (and optionally any hardware elements or brackets or hinges or the like) to the glass panels. The frit layer may be substantially opaque, and thus may improve the overall appearance of the window assembly, since the bonding surfaces are not readily discernible or viewable through the glass panels and the frit layer. Examples of such frit layers are described in U.S. Pat. Nos. 7,360,338; 7,332,225; 6,871,450; 6,846,039; 6,319, 344; 6,298,606; 6,128,860; 6,068,719; 5,966,874; 5,853, 895; 5,704,173; and 5,551,197, which are hereby incorporated herein by reference in their entireties. The frit layer may be disposed onto the surfaces of the glass panels in any desired pattern, such as stripes, dots, wave pattern or the like, to provide the desired appearance to the window panels, depending on the particular application of the window assembly.

Figure 7:
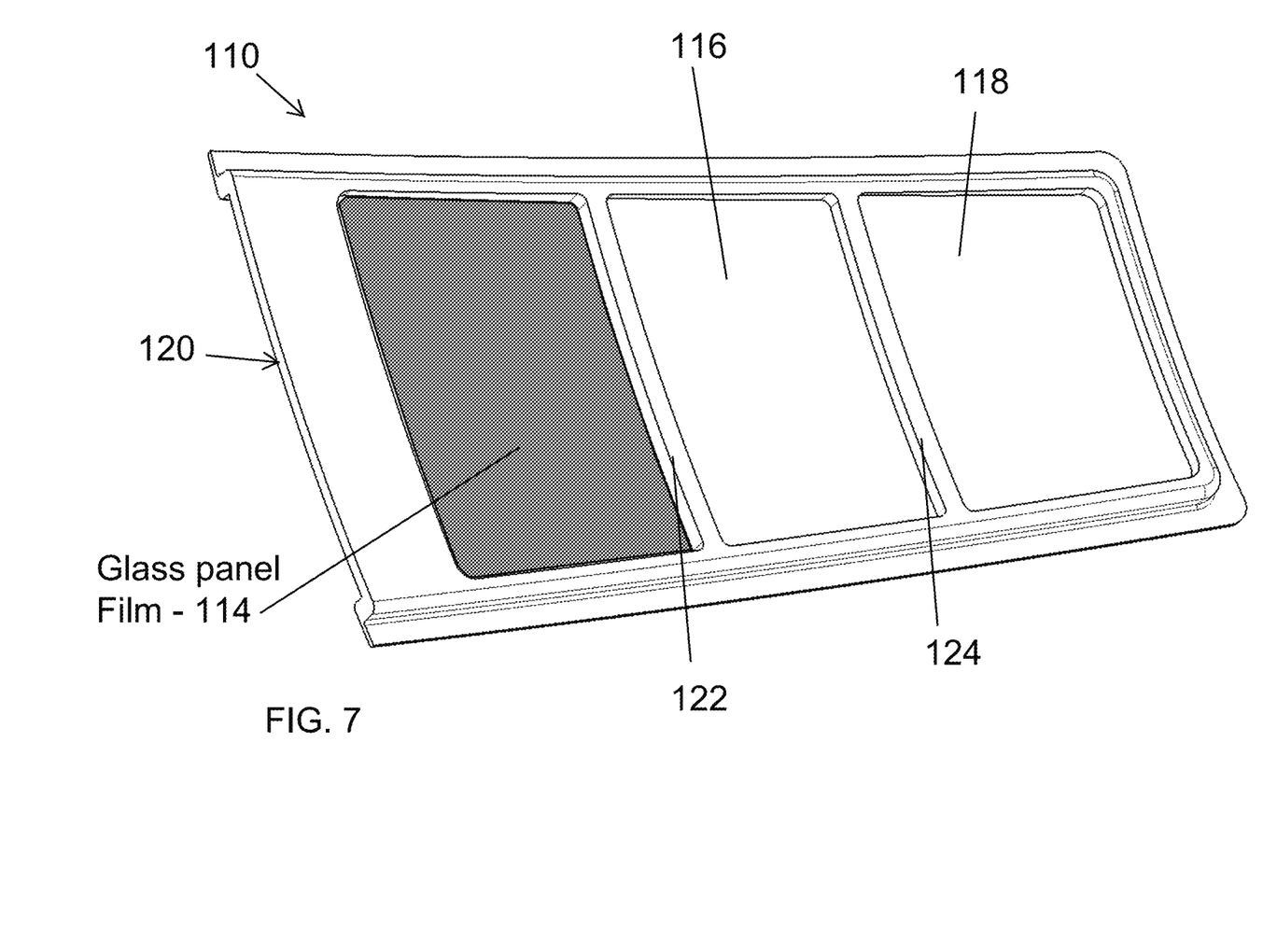
FIG. 7 is a perspective view of another vehicular window assembly of the present invention, with an opaque film established at a window panel of the window assembly.
Figure 8:
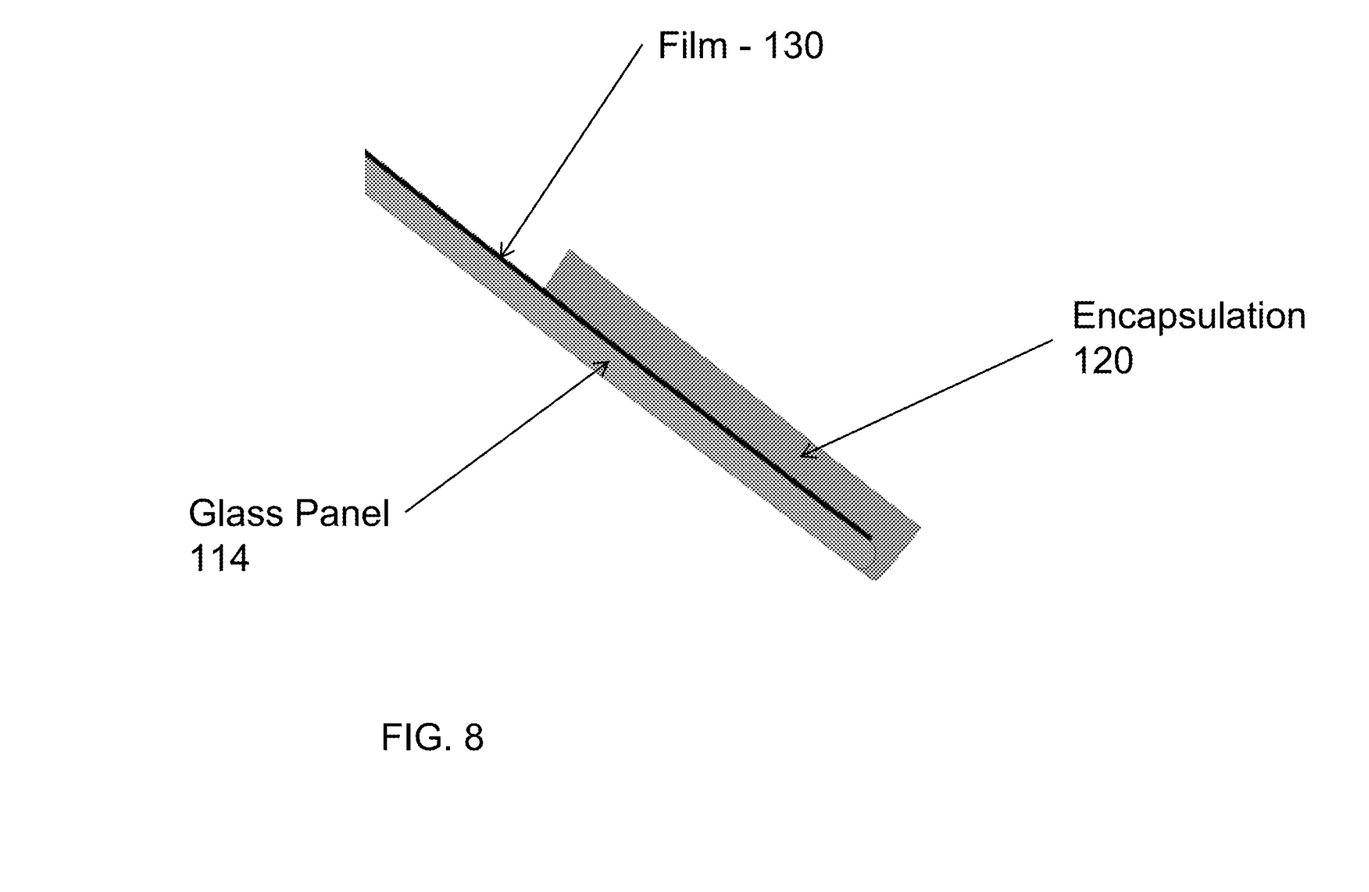
FIG. 8 is a sectional view of the window assembly of FIG. 7, showing the film at the window panel and between the encapsulation and the window panel.

Optionally, an opaque or patterned or colored film may be adhered or bonded or established at the surface of one or more of the window panels of the louvered window assembly to provide the desired opaqueness and appearance to the window assembly. For example, and with reference to FIGS. 7-9, a vehicular window assembly 110 comprises a plurality of glass window panels 114, 116, 118 that are louvered or non-coplanar, with at least one of the window panels (such as window panel 114 in the illustrated embodiment) having an opaque film 130 established at a surface thereof. The glass window panels 114, 116, 118 are disposed at a perimeter frame or encapsulation 120 and have an encapsulation portion or rib 122 at and between and adjoining panels 114 and 116 and an encapsulation portion or rib 124 at and between and adjoining panels 116 and 118. The ribs 122, 124 may be integrally formed or molded with the frame portion 120 to provide an encapsulation that captures or encapsulates the perimeter edges of each of the window panels 114, 116, 118, such as in a similar manner as discussed above.

Figure 9:
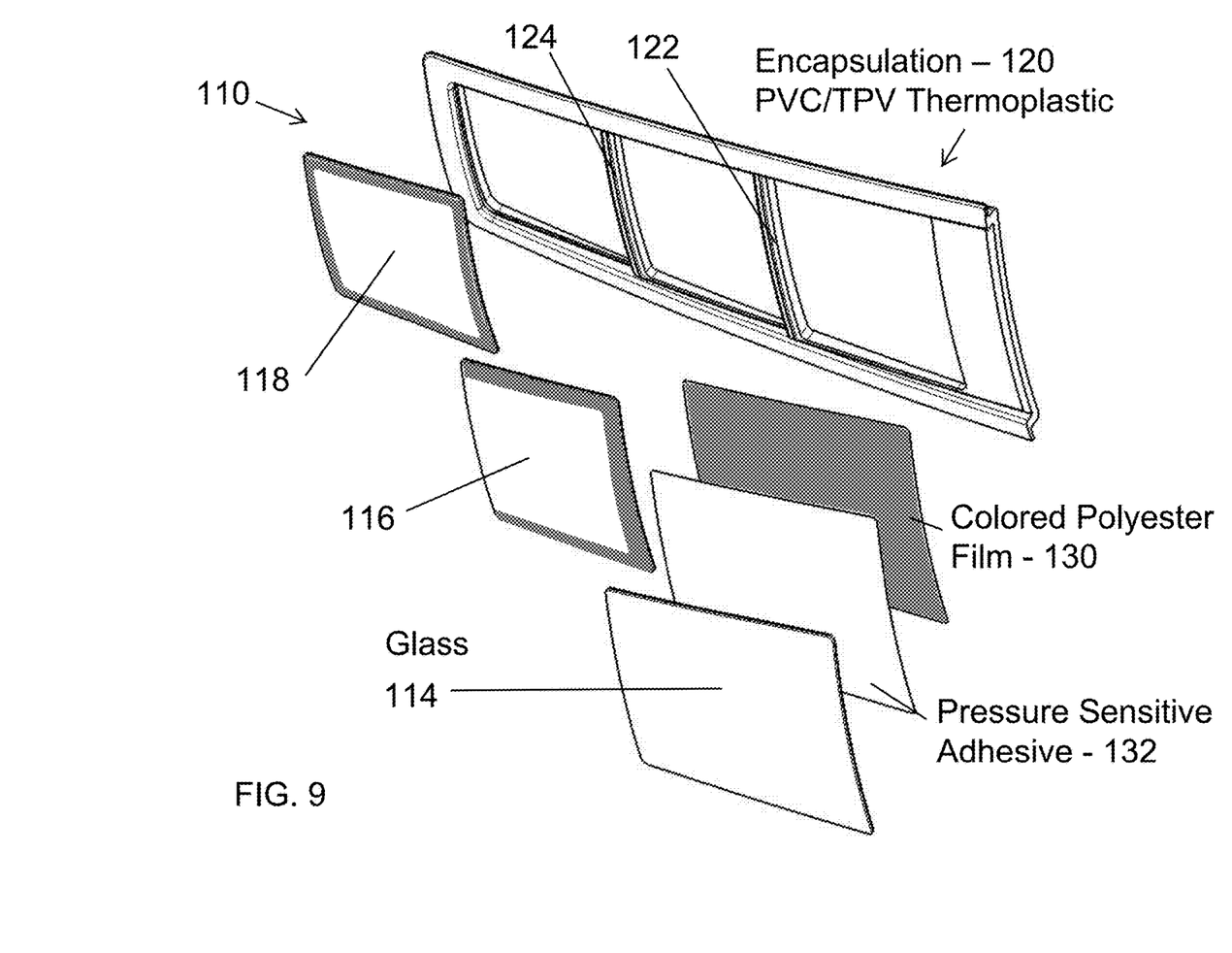
FIG. 9 is an exploded perspective view of the window assembly of FIG. 7.

As shown in FIG. 9, the film 130 (such as a colored or tinted or darkened polyester film or the like) is bonded or adhered at the interior surface of the window panel 114 via an adhesive layer 132, such as a pressure sensitive adhesive or the like. Optionally, and desirably, the film is adhered or attached at the window panel surface before the encapsulation 120 is molded over and along the panel edges and between the window panels so as to achieve a frit-like appearance for the window assembly. The film 130 may comprise any suitable film or layer or sheet, such as an opaque or colored film or such as a patterned film or the like. Optionally, for example, the film may comprise a PET film or the like, and/or may comprise, for example, a Black Out-X film commercially available from Madico, Inc. of Woburn, Mass. Optionally, one of the window panels (such as leading panel 114 in the illustrated embodiment) may have the film 130 disposed over substantially its entire surface and one or more of the other window panels may have a film or frit layer established about and along their perimeter regions. The film 130 provides a frit-like appearance to the film-covered window panel without having to establish a frit layer over the entire surface of the window panel.

After the film is adhered or bonded or affixed at the surface of the window panel, the window panels (including the film-coated window panel) may be disposed in a molding cavity (or cavities) and the encapsulation may be molded around and along the perimeter edges of the window panels with the ribs 122, 124 formed or molded between the respective adjacent window panels. As can be seen with reference to FIG. 8, the film 130 and encapsulation 120 are configured or established such that the encapsulation 120 overlaps or overlays at least a portion of the film 130 along the perimeter region of the window panel surface so that, to an observer viewing the window panel, the film has the appearance of a frit material or coating that at least substantially covers or encompasses the window panel surface. Optionally, a portion of the film may be patterned or may include a logo or icon or text or images or the like, to provide the desired appearance at the window panel or panels. Optionally, the encapsulation may be overmolded onto the perimeter edge portions of the glass panels or may otherwise bonded at the perimeter edge portions of the glass panels.

Thus, the present invention provides a louvered window assembly for a vehicle. The perimeter frame portion or encapsulation may be established along and around the perimeter edge regions of the glass panels and between and adjoining adjacent perimeter edge regions of adjacent glass panels. Optionally, the encapsulations may be molded over and around the perimeter edge regions of the glass panels or may be bonded along the perimeter edge regions of the glass panels. Optionally, the encapsulations may encompass the perimeter regions of the inner surfaces of the glass panels and the perimeter edges of the glass panels, with the outer surfaces of the glass panels being exposed. Optionally, the louvered window panels may partially overlap one another (such as the rear perimeter region of the forward window panel overlapping the forward perimeter region of the adjacent middle or rearward window panel), with the respective encapsulation disposed between the inner and outer surfaces of the overlapping portions of the window panels, while remaining within the spirit and scope of the present invention. The perimeter edge region of the outer overlapping window panel thus may have a frameless appearance with the cut or rounded or ground glass perimeter edge of the window panel being substantially or entirely exposed.

Optionally, the window assembly or assemblies of the present invention may utilize aspects of the window assemblies described in U.S. Pat. Nos. 7,838,115; 7,332,225; 6,846,039; 6,319,344; 6,068,719; 5,853,895; 7,588,652; 7,360,338; 6,871,450; 6,298,606; 6,128,860; 5,966,874; 5,704,173; 5,551,197; 7,073,293; 7,003,916; and/or 6,691,464, and/or U.S. patent applications Ser. No. 11/263,221, filed Oct. 31, 2005 and published May 25, 2006 as U.S. Publication No. 2006-0107600; Ser. No. 11/948,094, filed Nov. 30, 2007, published Jun. 5, 2008 as U.S. Publication No. 2008-0127563; Ser. No. 10/454,040, filed Jun. 4, 2003 and published Feb. 5, 2004 as U.S. Publication No. 2004-0020131; Ser. No. 10/408,047, filed Apr. 4, 2003 and published Nov. 20, 2003 as U.S. Publication No. 2003-0213179, and/or Ser. No. 12/850,864, filed Aug. 5, 2010, now U.S. Pat. No. 8,402,695, and/or PCT Application No. PCT/US2011/051506, filed Sep. 13, 2011 and published on Mar. 22, 20012 as International Publication No. WO2012/037190, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A window assembly for a vehicle, said window assembly comprising:
 a plurality of window panels arranged with at least one pair of adjacent window panels;
 wherein adjacent edge portions of said adjacent window panels are fixedly joined by a respective molded joining element, and wherein said molded joining element is at least partially overmolded and joined at the respective edge portions of said adjacent window panels;
 wherein said adjacent edge portions joined by the respective molded joining element are offset or non-coplanar; and
 wherein said molded joining element is at least partially overmolded at each of the respective adjacent edge portions of said adjacent window panels and is fixedly attached at each of the respective adjacent edge portions of said adjacent window panels.

2. The window assembly of claim 1, wherein said window panels comprise glass window panels.

3. The window assembly of claim 1, wherein said window assembly comprises a side or rear or top window of a vehicle.

4. The window assembly of claim 1, wherein said molded joining element comprises an encapsulation that at least partially receives a perimeter edge portion of at least one of said adjacent window panels.

5. The window assembly of claim 1, wherein said adjacent window panels comprise first and second window panels.

6. The window assembly of claim 5, wherein said window assembly comprises a side window assembly of a vehicle and wherein said second window panel is disposed rearward of said first window panel.

7. The window assembly of claim 6, wherein said molded joining element at least partially receives a rear perimeter edge portion of said first window panel and does not overlap an outer surface of said first window panel and wherein said molded joining element at least partially receives a front perimeter edge portion of said second window panel.

8. The window assembly of claim 7, wherein an outer surface of said first window panel at or near said rear perimeter edge portion is non-coplanar with an outer surface of said second window panel at or near said front perimeter edge portion.

9. The window assembly of claim 8, comprising a third window panel adjacent and rearward of said second window panel, and wherein a second molded joining element at least partially receives a rear perimeter edge portion of said second window panel and does not overlap an outer surface of said second window panel and wherein said second molded joining element at least partially receives a front perimeter edge portion of said third window panel, and wherein an outer surface of said third window panel at or near said front perimeter edge portion is non-coplanar with an outer surface of said second window panel at or near said rear perimeter edge portion.

10. The window assembly of claim 9, comprising a perimeter encapsulation that is established about a periphery of said window panels.

11. The window assembly of claim 10, wherein said perimeter encapsulation partially receives a perimeter edge portion of said first, second and third window panels and does not overlap an outer surface of said first, second and third window panels.

12. The window assembly of claim 1, comprising a perimeter encapsulation that is established about a periphery of said window panels, wherein at least one of said window panels has an opaque film bonded at a surface thereof, and wherein said perimeter encapsulation at least partially overlaps said window panel surface and said opaque film disposed thereat.

13. A window assembly for a vehicle, said window assembly comprising:
    first and second window panels arranged with at least one pair of adjacent window panels;
    wherein adjacent edge portions of said adjacent window panels are joined by a molded joining element;
    wherein said adjacent edge portions joined by said molded joining element are offset or non-coplanar;
    wherein said molded joining element comprises an encapsulation that at least partially receives and attaches at a first perimeter edge portion of said first window panel and does not overlap an outer surface of said first window panel and wherein said molded joining element at least partially receives and attaches at a second perimeter edge portion of said second window panel;
    a perimeter encapsulation established about a periphery of said window panels; and
    wherein said molded joining element joins said first perimeter edge portion with said second perimeter edge portion so that said first window panel does not slide or pivot relative to said second window panel and does not disengage one of said perimeter edge portions from said molded joining element.

14. The window assembly of claim 13, wherein an outer surface of said first window panel at or near said first perimeter edge portion is non-coplanar with an outer surface of said second window panel at or near said second perimeter edge portion.

15. The window assembly of claim 13, wherein said perimeter encapsulation partially receives a perimeter edge portion of said first and second window panels and does not overlap an outer surface of said first and second window panels.

16. The window assembly of claim 13, wherein at least one of said window panels has an opaque film bonded at a surface thereof, and wherein said perimeter encapsulation at least partially overlaps said window panel surface and said opaque film disposed thereat.

17. A window assembly for a vehicle, said window assembly comprising:
    first, second and third window panels arranged relative to one another so that a rear perimeter edge portion of said first window panel is generally adjacent to a front perimeter edge portion of said second window panel and a rear perimeter edge portion of said second window panel is generally adjacent to a front perimeter edge portion of said third window panel;
    wherein said rear perimeter edge portion of said first window panel and said front perimeter edge portion of said second window panel are fixedly joined by a first molded joining element;
    wherein said rear perimeter edge portion of said second window panel and said front perimeter edge portion of said third window panel are fixedly joined by a second molded joining element;
    wherein said adjacent edge portions joined by the respective first or second molded joining element are offset or non-coplanar;
    wherein said first molded joining element at least partially receives and attaches at said rear perimeter edge portion of said first window panel and does not overlap an outer surface of said first window panel and wherein said first molded joining element at least partially receives and attaches at said front perimeter edge portion of said second window panel;
    wherein said second molded joining element at least partially receives and attaches at said rear perimeter edge portion of said second window panel and does not overlap an outer surface of said second window panel and wherein said second molded joining element at least partially receives and attaches at said front perimeter edge portion of said third window panel; and
    a perimeter encapsulation established about a periphery of said arranged first, second and third window panels.

18. The window assembly of claim 17, wherein an outer surface of said first window panel at or near said rear perimeter edge portion is non-coplanar with an outer surface of said second window panel at or near said first molded joining element, and wherein an outer surface of said third window panel at or near said front perimeter edge portion is non-coplanar with an outer surface of said second window panel at or near said second molded joining element.

19. The window assembly of claim 17, wherein said first and second molded joining elements and said perimeter encapsulation are formed together as parts of a unitary molded element.

20. The window assembly of claim 17, wherein said perimeter encapsulation partially receives a perimeter edge portion of said first, second and third window panels and does not overlap an outer surface of said first, second and third window panels.

* * * * *